US011939807B2

(12) United States Patent
Anderson et al.

(10) Patent No.: US 11,939,807 B2
(45) Date of Patent: Mar. 26, 2024

(54) VERTICAL PIVOTING GATE OPERATOR

(71) Applicant: AutoGate, Inc., Berlin Heights, OH (US)

(72) Inventors: Peter J. Anderson, Creedmoor, NC (US); David Flaherty, Berlin Heights, OH (US)

(73) Assignee: AutoGate, Inc., Berlin Heights, OH (US)

(*) Notice: Subject to any disclaimer, the term of this patent is extended or adjusted under 35 U.S.C. 154(b) by 14 days.

(21) Appl. No.: 17/362,710

(22) Filed: Jun. 29, 2021

(65) Prior Publication Data

US 2021/0404238 A1 Dec. 30, 2021

Related U.S. Application Data

(60) Provisional application No. 63/045,945, filed on Jun. 30, 2020.

(51) Int. Cl.
*E05F 15/00* (2015.01)
*E05F 15/627* (2015.01)
(Continued)

(52) U.S. Cl.
CPC ............ *E05F 15/627* (2015.01); *E05F 15/63* (2015.01); *E06B 11/025* (2013.01);
(Continued)

(58) Field of Classification Search
CPC ......... E05F 15/627; E05F 15/63; E06B 11/04; E06B 11/025; E05Y 2201/434;
(Continued)

(56) References Cited

U.S. PATENT DOCUMENTS 1,874,926 A * 8/1932 Macdonald ............. B61L 29/02 49/192
1,888,058 A * 11/1932 Vincent ................. B61L 29/243 49/192
(Continued)

FOREIGN PATENT DOCUMENTS

WO WO-9205314 A * 4/1992 ............. E01F 13/06

OTHER PUBLICATIONS

JAS Model Operator Manual—Master Operator Components, 1 page, date unknown.

*Primary Examiner* — Jerry E Redman
(74) *Attorney, Agent, or Firm* — Foley & Lardner LLP

(57) ABSTRACT

A vertical pivoting gate operator for positioning a gate between an open position and a closed position is provided. The gate operator includes a motor drive assembly including a motor and a linkage assembly mechanically connecting a motor output to the gate such that in response to actuation of the motor, the linkage assembly transmits an opening force to positioning the gate toward the open position, and a closing force, for positioning the gate toward the closed position. A counterbalance assembly including a biasing member is operable to release stored energy against an input link to rotate a gate arm shaft so as to urge the gate toward the open position and to increase stored energy in response to rotation of the gate traveling toward the closed position to act against the gate as it approaches the closed position.

12 Claims, 10 Drawing Sheets

(51) Int. Cl.
*E05F 15/63* (2015.01)
*E06B 11/02* (2006.01)

(52) U.S. Cl.
CPC ... *E05Y 2201/434* (2013.01); *E05Y 2201/474* (2013.01); *E05Y 2201/652* (2013.01); *E05Y 2201/656* (2013.01); *E05Y 2201/668* (2013.01); *E05Y 2201/686* (2013.01); *E05Y 2201/702* (2013.01); *E05Y 2900/40* (2013.01)

(58) Field of Classification Search
CPC ......... E05Y 2201/474; E05Y 2201/652; E05Y 2201/656; E05Y 2201/668; E05Y 2201/686; E05Y 2201/702; E05Y 2900/40
USPC .............................................................. 49/49
See application file for complete search history.

(56) References Cited

U.S. PATENT DOCUMENTS

| | | | | | |
|---|---|---|---|---|---|
| 1,948,512 | A * | 2/1934 | Everett | B61L 29/20 246/299 |
| 1,997,199 | A * | 4/1935 | Pranger | B61L 29/02 49/247 |
| 2,295,419 | A * | 9/1942 | Miskelly | B61L 29/226 74/411 |
| 3,038,991 | A * | 6/1962 | Swanton | B61L 29/226 246/219 |
| 4,658,543 | A * | 4/1987 | Carr | B61L 29/04 49/192 |
| 4,934,097 | A * | 6/1990 | Quante | E01F 13/085 404/6 |
| 5,131,187 | A * | 7/1992 | Agnew | E05F 1/1075 49/386 |
| 5,263,281 | A * | 11/1993 | Osborn | E01F 13/06 49/340 |
| 6,009,670 | A | 1/2000 | Howard | |
| 6,611,992 | B1 * | 9/2003 | Arnaud | E05F 15/63 16/DIG. 7 |
| 7,384,017 | B1 * | 6/2008 | Burke | B61L 29/04 246/127 |
| 7,818,920 | B2 * | 10/2010 | Causey | E01F 13/06 49/49 |
| 8,240,618 | B1 * | 8/2012 | Luetzow | E01F 13/06 246/111 |
| 9,272,721 | B2 * | 3/2016 | Bohme | B61L 29/10 |
| 2003/0019158 | A1 * | 1/2003 | Gagnon | E01F 13/06 49/227 |
| 2003/0029089 | A1 * | 2/2003 | Wenzl | E01F 13/06 49/49 |
| 2004/0118048 | A1 * | 6/2004 | Ronald | B61L 29/04 49/49 |
| 2007/0194506 | A1 * | 8/2007 | Adoline | F16F 13/007 267/168 |
| 2011/0113690 | A1 * | 5/2011 | Luetzow | E01F 13/06 49/506 |
| 2012/0137590 | A1 * | 6/2012 | Sullivan | E01F 13/06 49/404 |
| 2015/0033629 | A1 * | 2/2015 | Barwick | E06B 11/085 49/13 |
| 2021/0404238 | A1 * | 12/2021 | Anderson | E05F 15/627 |

* cited by examiner

VERTICAL PIVOTING GATE OPERATOR

CROSS REFERENCE TO RELATED APPLICATION

This application claims priority to and the benefit of U.S. Provisional Patent Application No. 63/045,945, filed on Jun. 30, 2020, the entire contents of which are incorporated herein by reference for all purposes.

BACKGROUND

Globally there is a great demand for security devices which control pedestrian and vehicle access to communities, apartments, storage facilities, hotels, governmental facilities, and the like. A common way to control access to these locations is by having a movable gate which lies across the pathway or driveway to block access, and once proper credentials are verified, an automatic gate operator moves the gate out of the pathway or driveway to momentarily allow access. Several different types of gate operators are manufactured. One type slides the gate out of the way using a chain drive and guided by wheels on a track while it is actuated linearly. This type is very slow by nature and since the track lies along the ground, debris can get caught in the track derailing the gate, vehicles driving over the guide can damage it, and also the entire gate length 20-30 ft. has to be stored retracted into an equivalent space.

Another type is a horizontal pivoting operator whereby the gate is swung parallel to the ground, and due to the space required usually has two operators one on each side of the driveway having a split gate with two movable halves which rotate out of the way. This means a portion of the driveway has to be clear of traffic to open and two separate operators are implemented.

A third type of operator, called a vertical pivoting gate operator whereby the operator swings a gate (oftentimes 20-30 ft long and ~200-300 lbs) vertically to unblock the driveway. The system must develop approximately 2000-3000 ft-lbs of torque for sufficient counterbalance of the gate to take place. These gate operators use long extension springs which are stretched with much linear force 2000-3000 lbs. When one of the springs fails and separates it can create a dangerous condition with part of a spring flinging around uncontrolled at high velocity. Another drawback related to these systems are inefficient methods to tension and de-tension the springs. A further drawback to this type of operator currently is in the event of detection of a vehicle in the way of a dropping gate, the system detects a vehicle in the way and tries to stop. Due to clutch slippage, the gate will still travel while stopping oftentimes causing impact to vehicles. Yet another drawback to these operators is that they are very heavy, causing shipping and installation drawbacks, are bulky causing site installation limits, and are an eyesore to the property. Therefore, a need exists to address the above-referenced disadvantages.

SUMMARY

Embodiments disclosed herein provide a lighter operator having a smaller overall footprint for a given gate to be lifted, a simpler and easier to use tensioning system, and a quick response direct drive, which decreases the time permitted to stop the gate to reduce the likelihood of the gate colliding with a vehicle while the gate is closing.

In addition, embodiments disclosed herein provide a drive system disconnection mechanism to disconnect the drive from the gate and gate counterweight.

In accordance with the above and the other advantages, an improved vertical pivoting gate operator is provided. In some embodiments, the operator has a unibody type structural housing construction with a motor and drive system, a counterspring system, tensioning system, and a drive train decoupling system all contained within the housing. In addition, some embodiments provide a removable lid is secured to the housing top to allow access to operator sub-systems and components. According to other embodiments, the system includes a side through hole that allows a coupling between the operator and the gate for pivotal movement of the gate by the operator.

DETAILED DESCRIPTION OF THE INVENTION

Figure 1A:
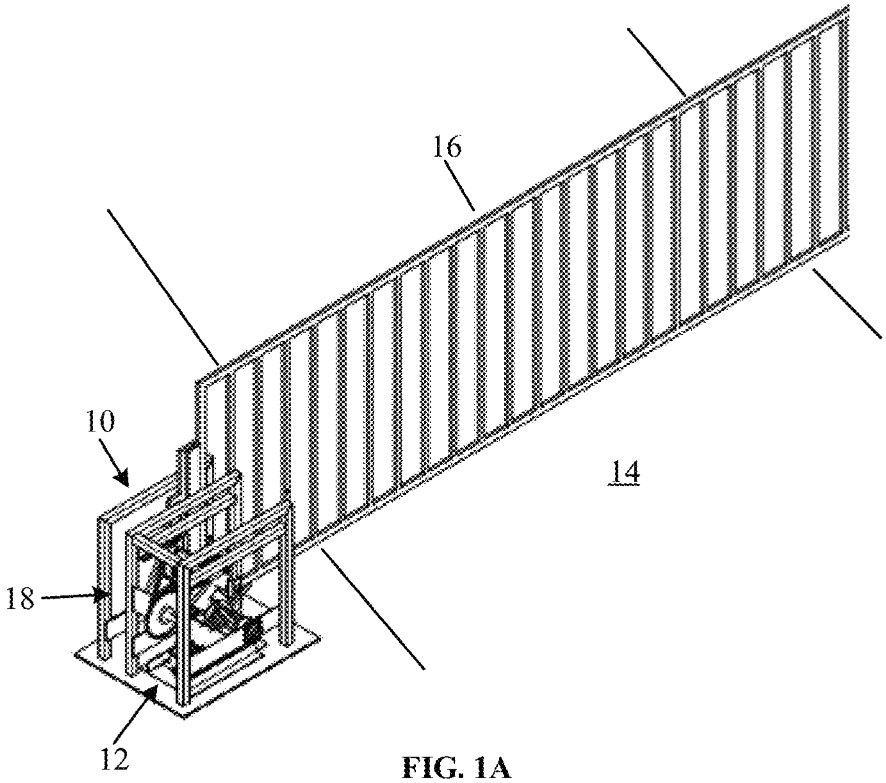
FIGS. 1A and 1B are perspective views of an embodiment of a vertical pivoting gate operator operable to move a gate between open and closed positions.

In the description which follows like parts are marked throughout the specification and drawing with the same reference numerals respectively. The drawing figures are not necessarily to scale and certain features may be shown in generalized or schematic form in the interest of clarity and conciseness.

Figure 1B:
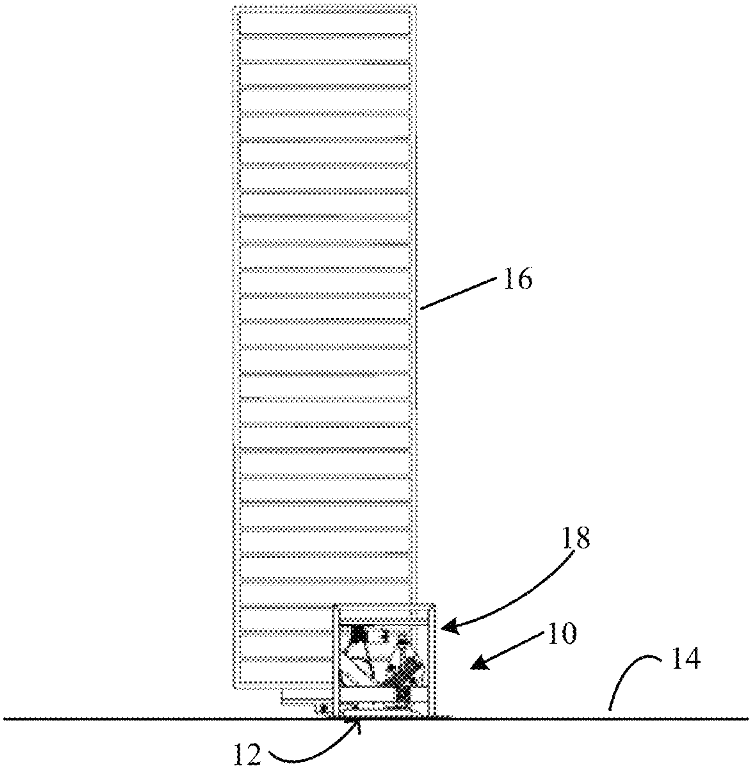

In the embodiment illustrated in FIGS. 1A and 1B, a vertical pivoting gate operator 10 is illustrated in which a drive system 12 is employed to advantage. As illustrated in FIG. 1A, the gate operator 10 is disposed adjacent to a driveway 14 and is operable to position a gate 16 or other type of barrier member between a closed position (FIG. 1A), whereby the gate 16 is generally parallel with the driveway 14, and an open position (FIG. 1B), whereby the gate 16 is disposed generally in a vertical position (i.e., rotated 90 degrees) with respect to the driveway 14.

In the embodiment illustrated in FIGS. 1A and 1B, the gate operator 10 includes a frame assembly 18, which as discussed in greater detail below, supports the components of the drive system 12. In addition, the frame assembly 18 enables the outer skins or walls (not illustrated) to enclose the components of the drive system 12. According to some embodiments, the skins are welded onto the frame assembly 18 to form a housing/enclosure, which is otherwise secured to a base plate 20 that supports the gate operator 10. It should be understood that the housing enclosure may be formed of any material or combinations thereof. In one embodiment, the housing/enclosure is a plastic molded unitary body that can be removably coupled to the frame assembly 18.

Figure 2A:
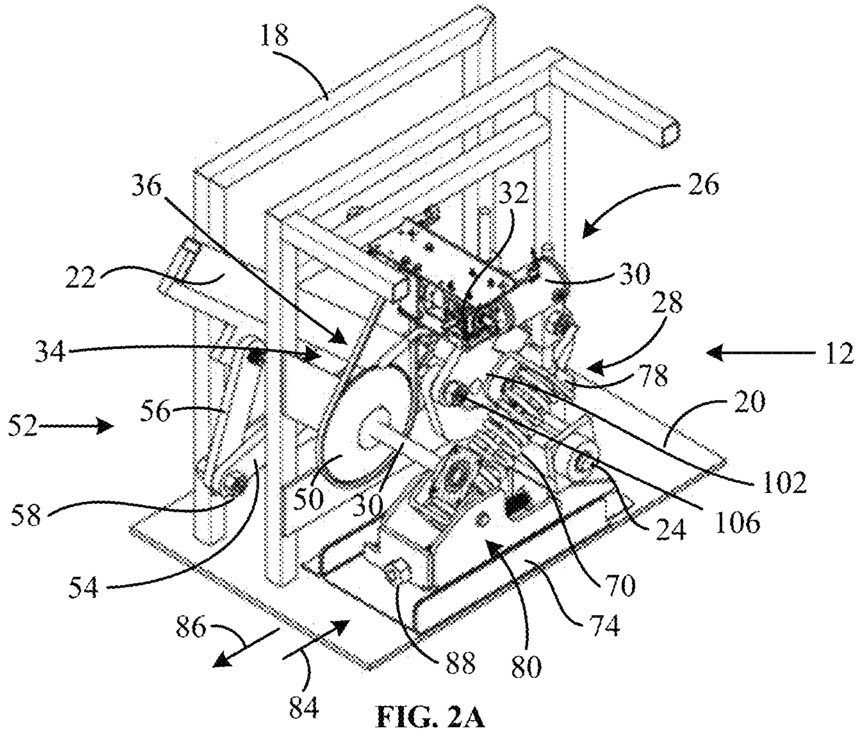
FIGS. 2A and 2B are front and rear perspective views of a portion of the pivoting gate operator.
Figure 2B:
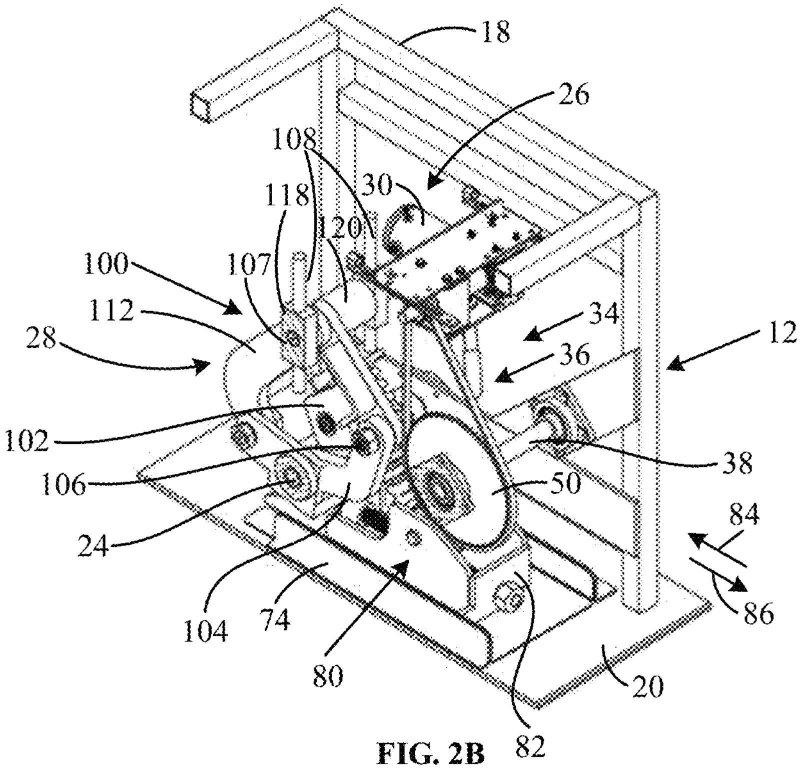

Referring to FIGS. 2A and 2B, the gate 16 (not shown) is secured to the drive system 12 via a gate arm 22, which is pivotably mounted on a gate arm shaft 24 and rotated such that, as explained in greater detail below, the gate 16 can be driven by the drive system 12 between the open and closed positions. In the embodiment illustrated in FIGS. 2A and 2B, the drive system 12 consists of a motor drive assembly 26 and a counterbalance/counterspring assembly 28, both operable to facilitate the movement of the gate 16 between the open and closed positions. With particular reference to FIGS. 2A and 2B, the drive assembly 26 includes a motor drive 30 having an output shaft that is coupled to a gearbox 32. According to some embodiments, the gearbox includes a worm assembly operable to transfer power into a sprocket assembly 36. In particular, the output from the gearbox 32 is secured to speed reduction assembly 34, which consists of the chain/sprocket assembly 36 to reduce rotational velocity of the output from the motor drive 30 at an output shaft 38 so, as discussed in greater detail below, the gate 16 moves at an appropriate speed as it travels between the open and closed positions. It should be understood that the drive assembly 26 may be otherwise configured. For example, in some embodiments, the speed reduction assembly 34 can include a belt/pulley system in lieu of the chain/sprocket assembly 36. Additionally or alternatively, the drive assembly 26 may be used without a gearbox 32 such that the output from the motor drive 30 is directly coupled to a sprocket, or series of sprockes, for driving the speed reduction assembly.

With continued reference to FIGS. 2A and 2B, a sprocket/pulley 50 is mounted on the output shaft 38 so that as the output shaft 38 rotates, a linkage assembly 52 is operable to transmit the opening and closing forces necessary to move the gate 16. As illustrated specifically in FIGS. 2A and 2C, the linkage assembly 52 includes first and second segments 54 and 56 that are pivotably coupled to the output shaft 38 and the gate arm 22, respectively, and are pivotably connected together along an axis 58. As explained in greater detail below, as motor 30 is actuated, it imparts rotational motion on the speed reduction assembly 34, causing the rotation of sprocket 50. Rotational movement of the sprocket 50 imparts the corresponding rotation of the output shaft 38. As the output shaft 38 rotates, the linkage assembly 52 is operable to move the gate 16 between the open and closed positions.

The counterbalance assembly 28 includes a biasing member 70 that is operable to facilitate, along with the motor drive assembly 26, the opening and closing of the gate 16 as it transitions between the open and closed positions. For example and as discussed in greater detail below, when the gate 16 is in the closed position, the point at which the force due to center of mass and gravity is greatest, the biasing member 70 is compressed and is in a stored energy state. As the gate 16 is raised to the open position, the stored energy in the compressed biasing mechanism 70 exerts an axial force causing a torque to urge the door from the closed position toward the open position. This is especially useful and enables a smaller or less powerful motor drive 30 to be used to move the gate 16. In addition, such counterbalance assembly 28, and in particular, the biasing member 70, enable larger, longer, and/or heavier gates to be used without having to increase the size of the motor drive 30. According to some embodiments, when the gate 16 is in the open position, counterbalance assembly 28 can be configured such that the biasing member 70 is compressed for storing spring energy therein, which can assist with movement of the gate 16 to the closed position, in similar fashion to that described above. In the embodiment illustrated in FIGS. 2A-2C, the biasing mechanism 70 is a compression spring. It should be understood, however, that other configurations may be used. For example, in some embodiments, a torsion spring may be used. Further, while one biasing mechanism 70 is illustrated, it should be understood that two or more biasing members 70 can be used depending on the desired needs.

Figure 2C:
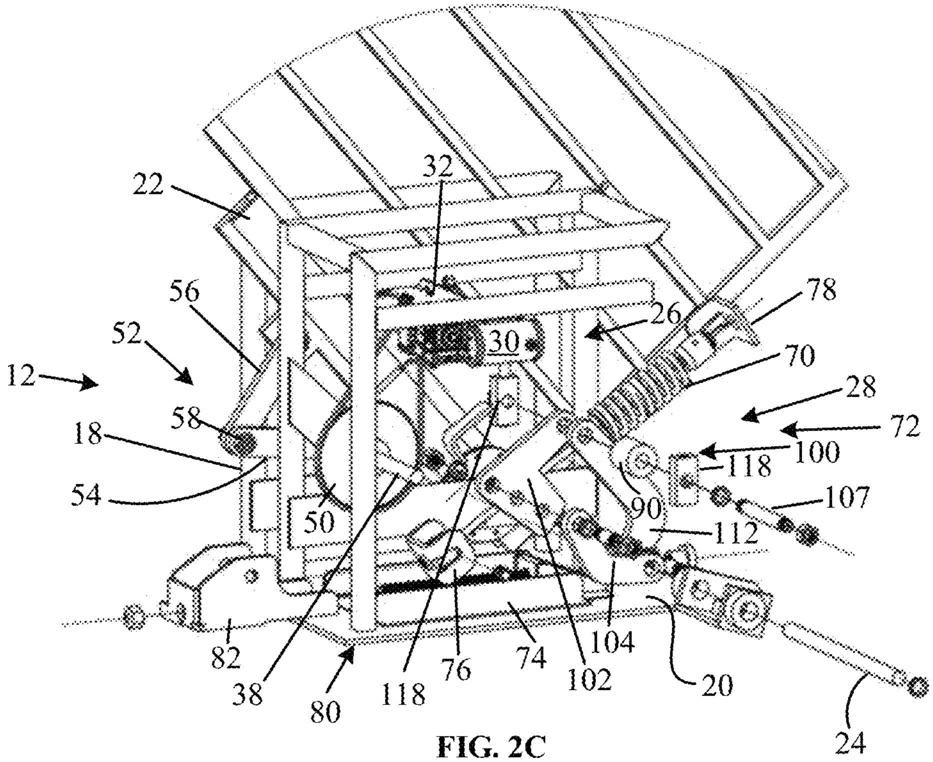
FIG. 2C is an exploded perspective view of the pivoting gate operator of FIGS. 1A-2B.

Referring specifically to FIG. 2C, the counterbalance assembly 28 further includes a spring support 72 that is operable to support and facilitate the tensioning of the biasing mechanism 70. In the embodiment illustrated in FIG. 2C, the spring support 72 includes an adjustment cradle 74 secured to the base 20, a lower cradle 76 and an opposed upper cradle 78 positioned the ends of and otherwise sandwiching the biasing member 70. The distance between the upper and lower spring cradles 76 and 78 can be adjusted to vary the tension of the biasing member 70 via a tensioning mechanism 80. Referring specifically to FIGS. 2A and 2C, the tensioning mechanism 80 includes the upper and lower cradles 74 and 76 and is configured such that lower cradle 76 is pivotably secured to an adjustment bracket 82, which is movable in the direction of arrows 84 and 86. In the embodiment illustrated in FIGS. 2A and 2C, the adjustment bracket 82 is slidably positioned within the adjustment cradle 74. In operation, when the adjustment bracket 82 is moved in the direction of arrow 84, the biasing member 70 is compressed. Likewise, when the adjustment bracket 82 is moved in the direction of arrow 86, the compression of the biasing member 70 is reduced. Accordingly, in the embodiment illustrated in FIG. 2A, when it is desired to compress the biasing mechanism 70, a bolt 88 or other member is turned in the clockwise direction to move the adjustment bracket 82 counterbalance and assembly 28. Similarly, when it is desired to reduce the stored energy in the biasing member 70, the bolt 88 is turned in the counterclockwise direction (FIG. 2A) to move or otherwise position the adjustment bracket in the direction of arrow 86.

In operation, the stored energy generated from the biasing member 70 is transferred to and acts on the gate 16 via a transfer assembly 100. Referring specifically to FIGS. 2A through 2C and FIG. 3 (note that in FIGS. 3A through 5B, the biasing member 70 has been removed for illustrative purposes), the transfer assembly 100 includes an input link 102 and a follower link 104. The follower link 104 is pivotably coupled to the gate arm shaft 24 and the opposed end of the follower link 104 is pivotably coupled to an end of the input link about an axis 106. In the embodiment illustrated in FIGS. 3A and 3B, the opposite end of the input link 102 is pivotably secured to a shaft 107 such that, as discussed in greater detail below, the shaft 107 moves in the direction of arrow 110 along a guide rod 108 in response to the release of stored energy in the biasing member 70. In operation, the stored energy in the compressed biasing member 70 exerts a force on the upper cradle 78, which is secured to the input link 102, to cause the input link 102 to move the shaft 107 in the direction of arrow 110.

Figure 3A:
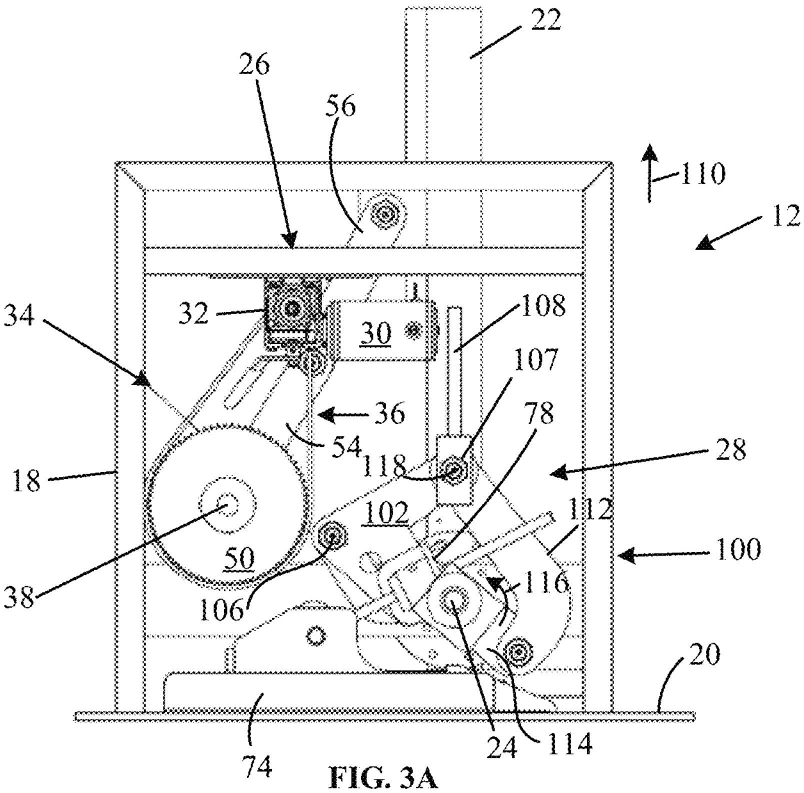
FIGS. 3A and 3B are front and rear views of the pivoting gate operator with the gate in the closed position.
Figure 3B:
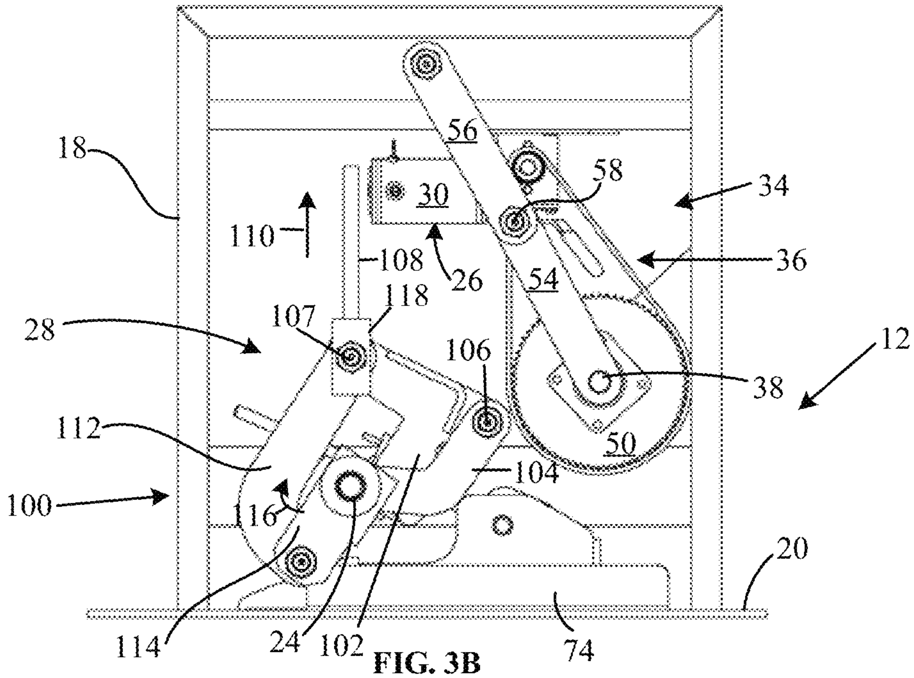
Figure 4A:
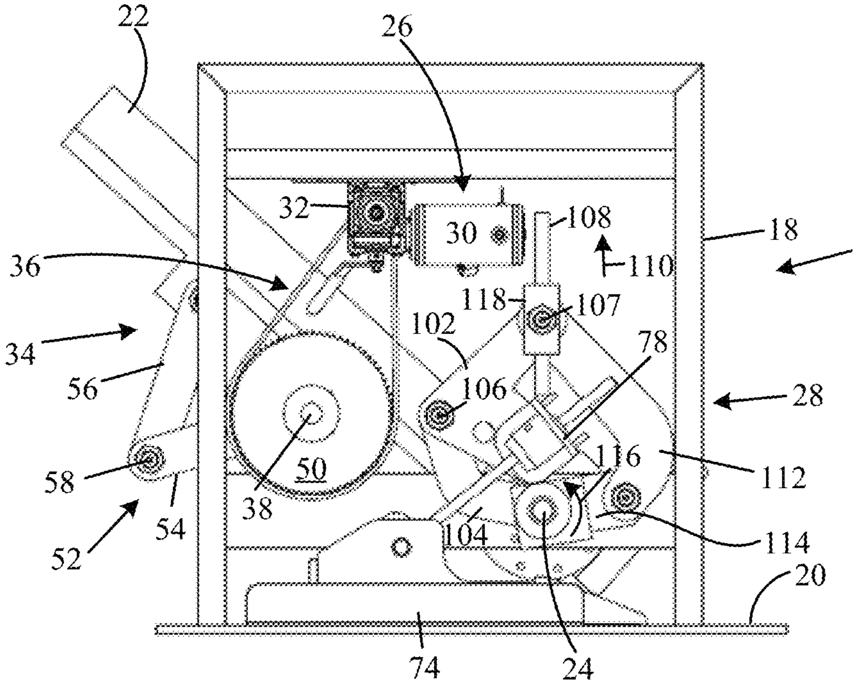
FIGS. 4A and 4B are front and rear views of the pivoting gate operator with the gate in the 45 degree, or halfway, position.
Figure 4B:
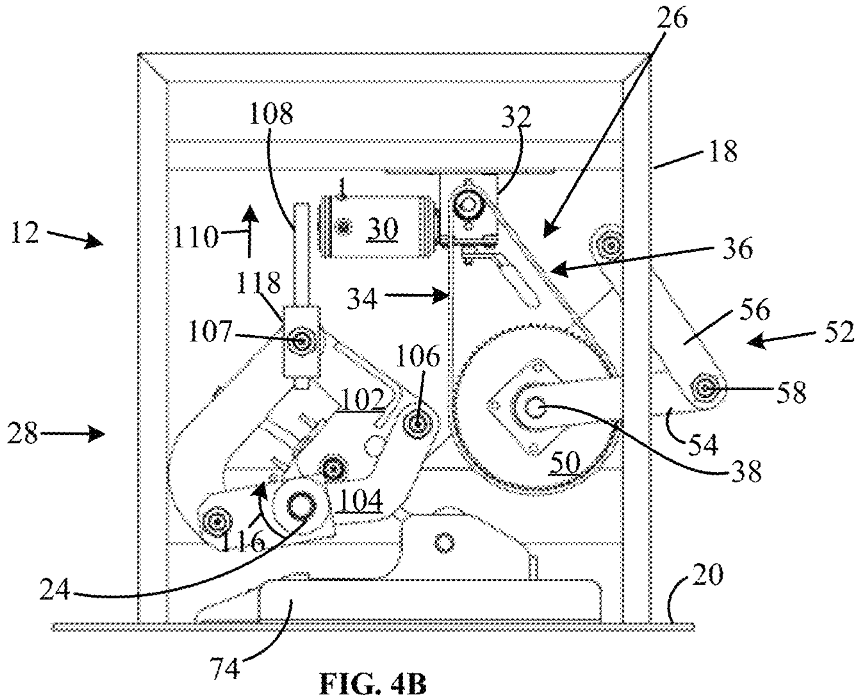

As the shaft 107 travels in the direction of arrow 110, a drive link 112, having a top end coupled to and otherwise movable with the shaft 107, also moves upward in the direction of arrow 110. As the drive link 112 moves in the direction of arrow 110, the opposite end thereof is pivotably secured to a gate arm link member 114, which is secured to, and is operable to rotate the gate arm shaft 24. In response to movement of the drive link 112 in the direction of arrow 110 (resulting from the stored energy in the biasing mechanism 70), the gate arm link member 114 rotates in in the direction of arrow 116 (FIGS. 3A and 3B and 4A and 4B), thereby rotating the gate arm shaft 24 therewith. In response to the gate arm shaft 24 rotated in the direction 116, the gate arm 22, and thus the gate 16 that is secured thereto (not illustrated), transitions from the closed position toward the open position, as best seen in FIGS. 3A and 4A.

Figure 5A:
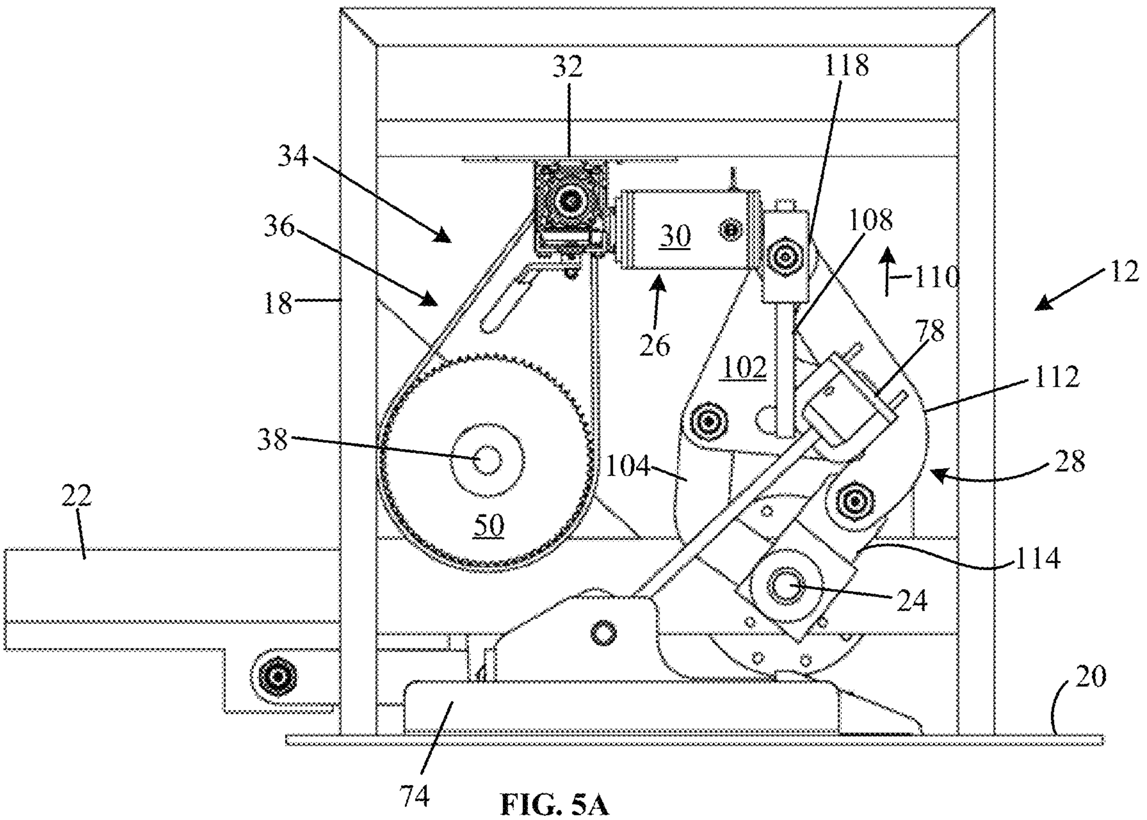
FIGS. 5A and 5B are front and rear view of the pivoting gate operator with the gate in the open position.
Figure 5B:
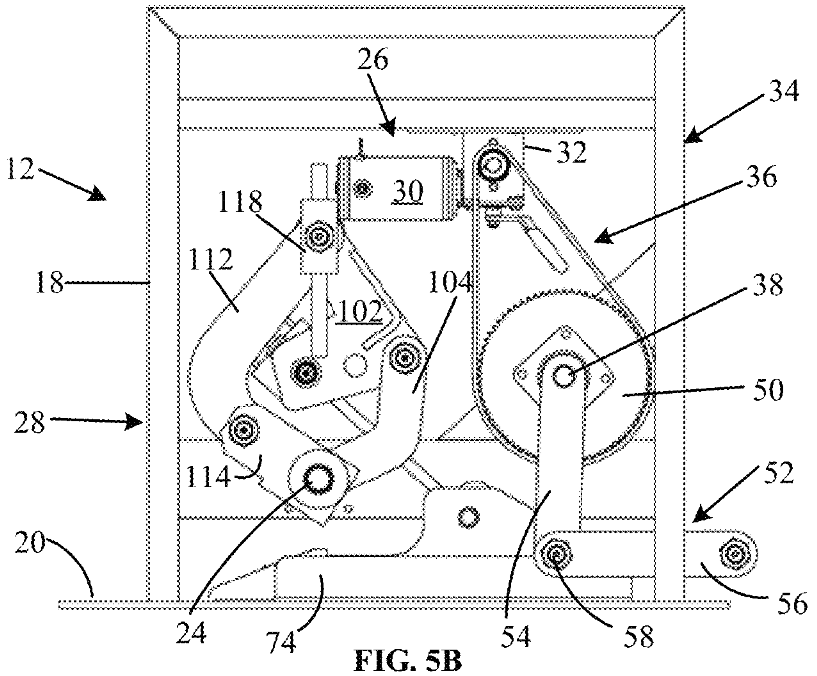

With continued reference to FIGS. 5A and 5B, the gate arm 22, and thus the gate 16 (not illustrated), are in the open position. In this configuration, the counterbalance assembly 28 and thus, the biasing member 70, is in the fully unbiased position. According to some embodiments however, the biasing member 70 can be sized and otherwise configured such that while the gate 16 is in the open position, the biasing member 70 can be tensioned such that upon the gate 16 approaching the open position, the biasing mechanism 70 can recompress to assist in the closing of the gate 16 from the fully open position. A secondary biasing spring mechanism (not shown) independent of the biasing mechanism 70 may also assist in the closing of the gate 16 from the fully open position. In addition, when the gate returns to the closed position, returning to the closed position, the biasing mechanism 70 is reenergizing.

It should be understood that as the gate approaches the closed position, the biasing member 70 stores energy therein and against the movement of the gate 16 to slow and in some instances, stop, the motion of the gate 16 as it approaches the closed position, alleviating the reliance solely on the motor drive 30 to actively brake and/or otherwise slow the motion of the gate 16 as it approaches the closed position.

Returning to FIG. 2B, the illustrated counterbalance assembly 28 includes two spaced apart and parallel guide rods 108 that slidably support the linear bearing members 118, which support the shaft 107 and thus, the input link 102, the drive link 112 and spacer member 120.

Figure 6:
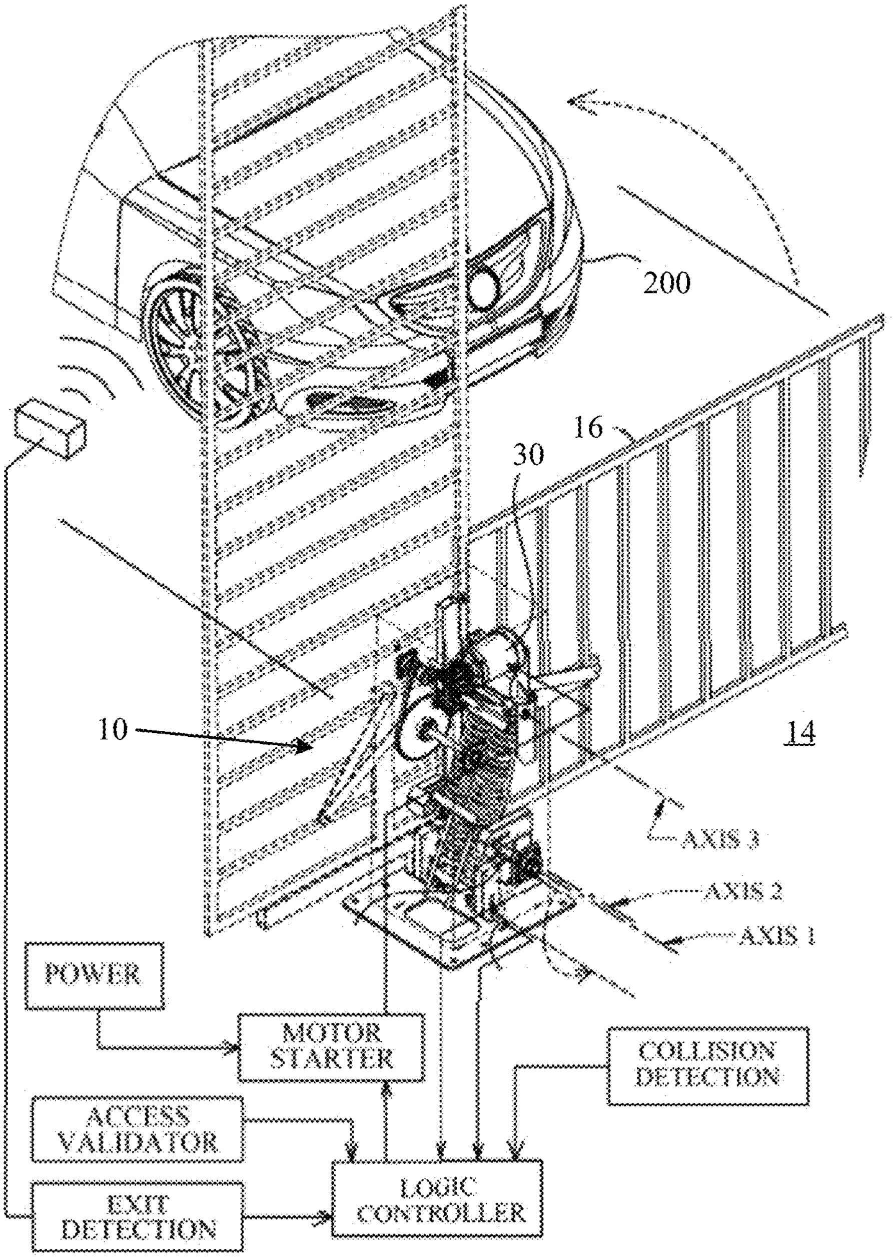
FIG. 6 is a perspective view of another embodiment of a vertical pivoting gate operator.

Referring now to FIG. 6, a perspective view of an embodiment of a vertical pivoting gate operator 10 installed adjacent to a driveway 14 and operable to pivot a gate or other type of barrier 16 about an axis 1 so as to allow ingress and egress of a vehicle 200 from to and from a secure zone enclosed by the gate 16. Similar to the embodiment illustrated in FIGS. 1A and 1B, the gate 16 is operable between a closed position, whereby it is generally parallel with the driveway 14, and an open position (illustrated in broken lines), whereby the gate 16 is disposed generally vertically with respect to the driveway 14.

Figure 7:
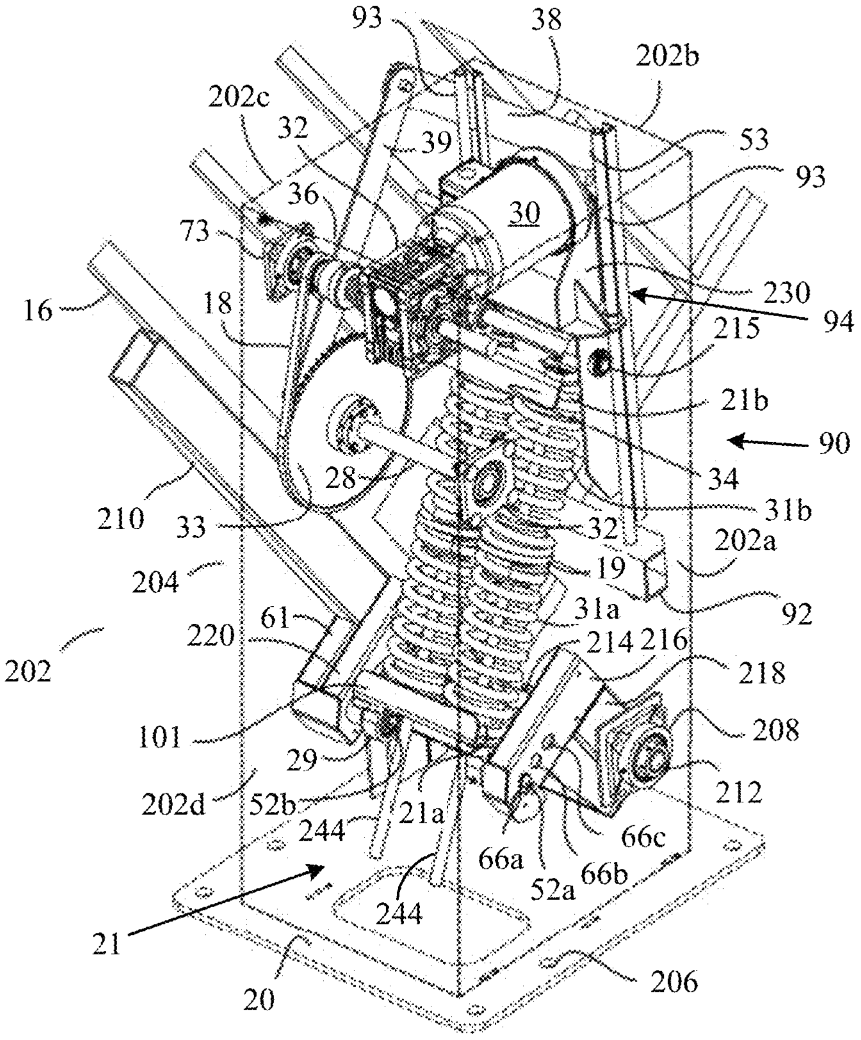
FIG. 7 is a detail perspective view of the vertical pivoting gate operator of FIG. 6.
Figure 8:
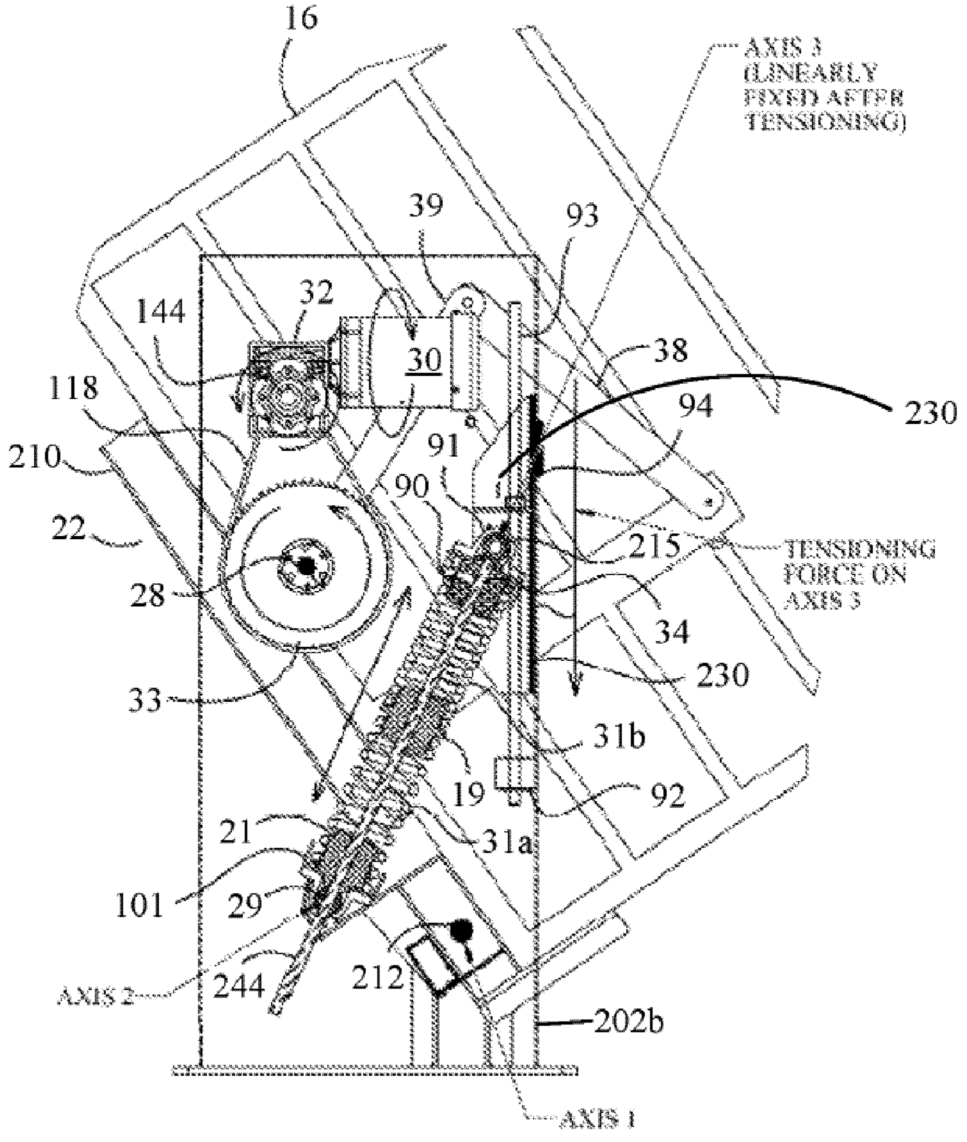
FIG. 8 is a section view of the vertical pivoting operator of FIGS. 6 and 7 in a generalized schematic illustrating the system kinematics.

In the embodiment illustrated in FIGS. 7 and 8, the drive system 202 is housed within and otherwise protected by a removable housing 204, including, by way of example, a rigid unibody-type welded housing 204 formed having four sidewalls 202_a_, 202_b_, 202_c_ and 202_d_ that are welded together and then welded or otherwise coupled to the base plate 20. In the embodiment illustrated in FIGS. 2A-5B, the base plate 20 includes mounting through-holes 206 to anchor the housing 204, and thus the drive system 202, to a support structure, such as a frame, concrete pad or other supporting structure adjacent to or otherwise on or near the driveway 14. Similar to the housing described above, it should be understood that housing 204 may formed of any material or combinations thereof. In one embodiment, the housing 204 is a plastic molded unitary body that can be coupled to a support structure as described above, for example.

With continued reference to FIGS. 7 and 8, a flange bearing 208 is mounted into the operator housing wall 202_a_ and a correspondingly mounted flange bearing 208 (not illustrated) that is supported by the baseplate 20 to enable gate arm 210 to be pivotably mounted and operable, as discussed in greater detail below, to position the gate 16 between the open and closed positions. According to some embodiments and similar to the embodiment illustrated in FIGS. 2A-5B, the gate arm 210 (22 in FIGS. 2A-5B) is a welded member configured and otherwise sized to support the gate 16 and is mounted so as to pivot about axis 1.

With particular reference to FIG. 7, a gate arm 210 is pivotably mounted on a gate arm shaft 212, which is mounted on the flange bearings 208 on each end. Additionally, a connector 214 is optionally included, which provides additional stiffening along the length of the gate arm shaft 212. Tubings 216 and 218 are welded together such that it provides a separated pivot point from axis 1 wherein pivot pin 52_a_ is bolted or otherwise attached into tubing 216. This supports one side of the compression spring force. On the other side of the torque weldment and attached to the control arm is tubing 220 to provide a separated pivot point 52_b_. In this way the gate arm 210 provides compression spring support and a way for linear guide shafts 244 to pass through without interfering with gate arm 210. In the embodiment illustrated, tubing holes 66_a_, 66_b_, and 66_c_ provide a way to move the pivot point to an optimal location for the compression spring counterbalance.

In the embodiment illustrated in FIGS. 7 and 8, a tensioning guide 230 is a channel with a crosswise hole through it to accept axis 3 pivot shaft 215. In the embodiment illustrated in FIGS. 7 and 8, the tensioning guide 230 is configured to receive at least one tensioning rod 93 extending therethrough, one on each side to align it and with adjust retainer 94 driven down, providing proper tension to the system. The backside of the tensioning guide 230 is slidingly located against sidewall 202_b_.

According to embodiments disclosed herein, when the gate 16 is positioned between 45 and 70 degree angles, that would be considered as a properly balanced position when motor drive assembly 26 system is decoupled from the operator drivetrain including gearbox 32 and the motor 30. In the embodiment illustrated in FIGS. 6-8, the gate 16 is pivoted about aforementioned axis 1 and has counterweight force applied to an axis 2, which is adjusted via 66_a_, 66_b_, and 66_c_ apart from the pivot shaft 212. To provide the counterbalance force through the entire length of gate travel and at the greatest at the closed position, and least at the open position, a set of compression springs 31_a_ and 31_b_ are implemented to be fully compressed at the closed position and relaxed (or even tensioned) at the open position. As can be seen in FIG. 8, the compression springs are locked in an alignment by a set of support bushings 21, 19, and 90 having through holes drilled therein and a linear shaft running through the center of all the bushings. Terminating the upper end of compression spring 31_b_, support bushing 90 radially locates the compression spring and mounts to channel 34 having pivot bearing 91 mounted thereupon. At the lower end of compression spring 31_a_, support bushing 21 radially locates the compression spring and is mounted upon channel 101 having pivot bearing 29 mounted thereupon. Bushing 19 supports the lower end of compression spring 31_b_ and the upper end of compression spring 31_a_ together with a linear guide rod 244. In this way, when the gate 16 is raised or lowered, the compression springs 31*a* and 31*b* maintain alignment with each other, which is difficult with long compression springs, the alignment bushings move linearly to maintain spring support while the springs expand and contract, and the springs maintain alignment with the respective axes 2 and 3 which they pivot on through the entire range of motion.

The tensioning guide 230 has axis 3 located within it. The tensioning guide 230 is adjusted via linear rod adjustment 93 and adjust retainer 94 until the compression springs are applying enough counterbalance force to incline the gate 16 to the desired balance position.

When the gate operator 10 is initially installed, there is zero tension as the operators 10 are shipped typically without the gate 16 attached, and then the gate 16 is mounted onto the operator gate arm 210 (22 in FIGS. 2A-5B) with the gate 16 in the closed position. Thereafter, the counterbalance tension is applied. A technician (not shown) compresses the biasing members 31*a* and 31*b* in order to apply enough force to counterbalance the gate.

In the embodiments disclosed herein, the motor drive 30 is drivingly coupled to a gearbox/worm reducer 32, which reduces drive rotation speed out of the motor 30 and increases system torque while driving shaft 144. In the embodiment illustrated in FIGS. 6-9B, a drive sprocket 35 which thereby drives a larger diameter sprocket 33, interconnected by means of a suitable chain 118. The diametrical difference between sprockets further reduces drive speed and further increases drive torque transferring the power through shaft 28 mounted through the center of the larger sprocket. A first control linkage 39 is welded onto the end on the shaft 28 on one end of the linkage, and pivotably connected to a second linkage 38 on the second end. The second linkage is then pivotably connected to the gate at pivot point 53 for actuation. In some embodiments the second linkage 38 may be pivotably attached to gate arm 210. Furthermore, the operator utilizes a gate arm 210, which suitably supports the gate 16 for actuation and adapts the gate 16 for pivoting about the pivot axis 212.

Referring specifically to FIGS. 7 and 8, the tension assembly 230 is pivotably mounted into suitable bearings 15 and also has bearing pivot pins which have pivotably mounted pillow block bearings 91 mounted thereupon. A set of bottom compression springs 31A are nestled onto a lower guide bushing set 21 which have two functions one they hold the compression springs in place during actuation and also have guide shafts 244 running through the center of them so as to maintain spring alignment during actuation. Furthermore, floating bushings 19 locate into respective ends of upper and lower compression springs 31*a*, 31*b* so that as the system actuates the floating bushings slide and allow spring guidance during actuation. Together, this assembly allows for stacked compression springs to work together.

The tension assembly 230 locates and supports the upper end of the upper compression springs 31*b* so as the gate 16 is pivoted down, and the compression springs 31*a* and 31*b* pivot upward both the upper compression springs and the upper nest bushings can pivot accordingly. Also, the tension assembly 230 has a suitable weldment with two adjusting rods 93 running through it on each side, the adjusting rods 93 securely anchored on the lower end into the housing. A tool (not shown) can be used to position two adjusting retainers on the respective sides of the tension assembly to adequately drive down the entire assembly so as to tension, and in turn also used to detention the compression springs 31*a* and 31*b*.

Figure 9A:
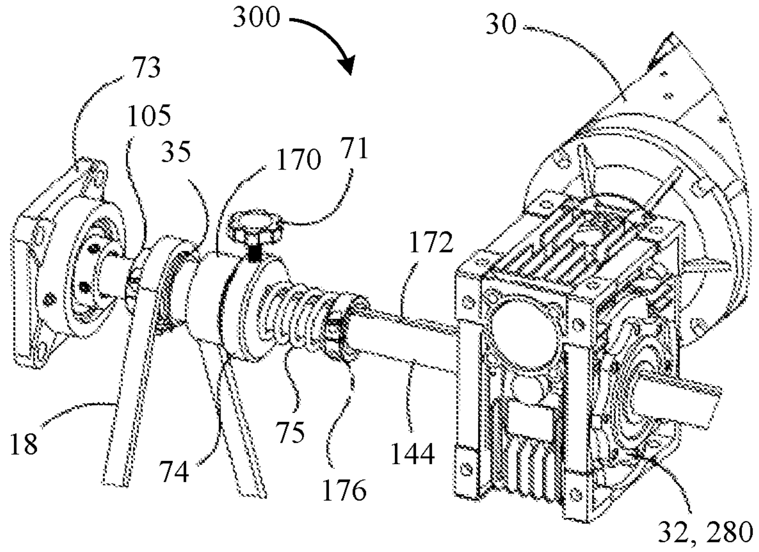
FIG. 9A is a detail view of a drivetrain disconnect assembly in a locked or coupled position.
Figure 9B:
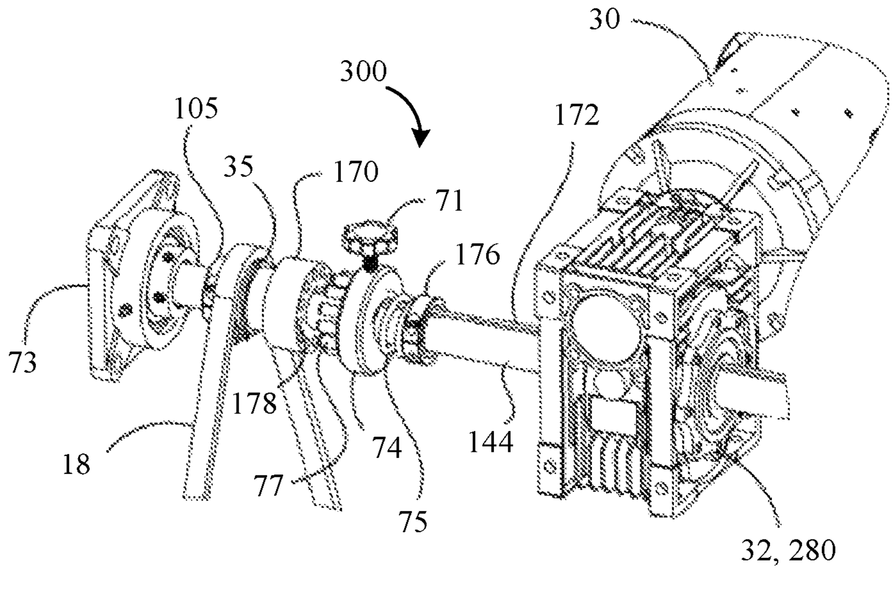
FIG. 9B is a detail view of the drivetrain disconnect assembly in an unlocked or uncoupled position.

Referring now to FIGS. 9A and 9B, a drivetrain disconnect coupling assembly 300 is configured in an engaged position so as to allow the motor 30 and worm reducer/gearbox 32 to transfer power through a driveshaft 144 into a drive sprocket 35 and therefore into the sprocket assembly 33. Bearing 73 supports the distal end of the driveshaft 144, and additionally, the driveshaft 144 is formed having a keyway cut into it lengthwise down one side terminating about halfway down, and a square elongated keystock 172 is imbedded into the keyway to provide a spline drive wherein slidable male jaw coupling 74 has a corresponding bore and keyway cut to match and receive the spline such that it has free linear movement, however is locked rotationally onto the spline.

In the embodiment shown in FIG. 9B, the jaw coupling has engaging teeth 77 arrayed radially about it so as to engage female jaw coupling 170 which does not have a spline, but is rotationally free about the driveshaft until the male jaw coupling engages with pockets 178. The drive sprocket 35 also has free rotary motion but stop collar 105 retains it linearly. To disengage the coupling assembly lock knob 71 or in other embodiments a release handle is loosened and pulled back to pull the male jaw coupling out of the female jaw coupling. A compression spring 75 facilitates a bias force to engage the couplings and keyed shaft collar 176 backs up the spring.

It should be noted that for all practical purposes the operator motor and drive system may not provide enough torque to vertically pivot the gate without an adequate counterweight or counterspring. For this reason, at least one biasing member, such as a set of high force compression springs 31*a* and 31*b*, 70 are utilized such that when the gate 16 is pivoted to the closed position, the compression springs 31*a* and 31*b*, 70 are fully compressed, thereby requiring minimal powered lifting torque to raise the gate 16. When the gate 16 is fully pivoted to the open position, there is considerably less torque on the system from the gate 16 because the gate center of gravity is generally located in closer proximity the pivot axis, and in turn, the compression springs 31*a* and 31*b*, 70 are almost completely unloaded while the gate is in the vertical position. In some embodiments, a secondary assist closing spring (not shown) may be used.

Additionally, the gearbox/worm reducer 32 is by nature not back-drivable in higher ratios, therefore no lock is required on the operator even if the operator loses power because the locking mechanics of the worm reducer maintain the drive and gate position.

In operation, a collision detection input into the controller is shown, and those who are skilled in the art of security access systems understand there can be many types of vehicle clearance and collision detection sensors, radar detectors, inductive loop detectors implemented to detect whether the vehicle is in front of the gate, exited the gate area, or potentially in the gate closing path.

At a normal condition with the gate closed, a limit switch or position sensor (not shown) detects the gate is in the closed position and a logic controller maintains the closed position. An operational cycle starts when either an access code is verified by an access validator or the vehicle is detected by a detection sensor thereby sending a signal to the logic controller. The logic controller then signals a motor starter to relay power to motor 30 to start the gate movement and continues until the gate is at a vertical orientation wherein a position sensor or limit switch activates and sends a signal to the logic controller to maintain an open position allowing the vehicle to exit at will. Once the vehicle exit detection sensor and collision detection sensors are clear, the logic controller sends a reversing signal to the motor starter and the motor starter reverses polarity to motor and the gate travels downward until the position sensor or limit switch is active again. The logic controller then signals for the motor to stop and maintain a closed position.

What is claimed is:

1. A vertical pivoting gate operator for positioning a gate between an open position and a closed position, the gate operator comprising:

a motor drive assembly including a motor and a linkage assembly mechanically connecting a motor output to the gate such that in response to actuation of the motor, the linkage assembly transmits an opening force for positioning the gate toward the open position, and a closing force, for positioning the gate toward the closed position;

a counterbalance assembly including a biasing member operable to release stored energy against an input link to rotate a gate arm shaft so as to urge the gate toward the open position and to increase stored energy in response to rotation of the gate traveling toward the closed position to act against the gate as the gate approaches the closed position; and a link shaft, the input link and a drive link pivotably mounted on the link shaft such that the link shaft is movable along at least one guide rod in response to the biasing member exerting a force on the input link.

2. The gate operator of claim 1, wherein the biasing member is at least one compression spring.

3. The gate operator of claim 1, wherein the motor drive assembly further includes a speed reduction assembly, the speed reduction assembly including a chain and sprocket or belt and pulley assembly.

4. The gate operator of claim 3, further comprising a gearbox disposed between the motor and the speed reduction assembly.

5. The gate operator of claim 4, wherein the gearbox includes a worm gear assembly.

6. The counterbalance assembly of claim 1, further comprising a follower link pivotably coupled to a first end of the input link such that in response to stored energy exerting a force on a second end of the input link, the follower link rotates the gate arm shaft so as to urge the gate toward the open position.

7. The counterbalance assembly of claim 1 further comprising a tensioning mechanism, the tensioning mechanism including an upper cradle pivotably secured to the drive link and a lower cradle pivotably secured to an adjustment bracket, such that in response to movement of the adjustment bracket, the stored energy in the biasing member is varied.

8. The tensioning mechanism of claim 7, wherein the adjustment bracket is slideably movable within an adjustment cradle to increase or decrease the stored energy in the biasing member by increasing or decreasing the length of the biasing member.

9. The gate operator of claim 1, further comprising a drivetrain disconnect assembly, the disconnect assembly operable between an engaged position to enable the motor to rotate the gate arm shaft, and a disengaged position to disconnect the motor from the gate arm shaft and enable manual operation of the gate.

10. A vertical pivoting gate operator for positioning a gate between an open position and a closed position, the gate operator comprising:

a gate arm shaft for positioning a gate between open and closed positions;

a gate arm secured to the gate arm shaft, the gate arm configured to support the gate thereon and position the gate between the open and closed positions;

a motor having an output;

a linkage assembly comprising a first segment mechanically coupled to an output shaft and a second segment mechanically coupled to the gate arm such that in response to actuation of the motor, the first segment and the second segment transmit an opening force from the output shaft to the gate arm for positioning the gate toward the open position, and transmit a closing force from the output shaft to the gate arm for positioning the gate toward the closed position;

a biasing member, the biasing member operable to exert a force on the gate arm shaft, wherein when the gate is in the closed position, the biasing member urges the gate arm shaft to rotate the gate toward the open position; and a speed reduction assembly coupled to the output of the motor, the speed reduction assembly comprising a chain and sprocket or belt and pulley assembly.

11. The gate operator of claim 10, wherein the biasing member is a compression spring.

12. A vertical pivoting gate operator for positioning a gate between an open position and a closed position, the gate operator comprising:

a gate arm shaft for positioning a gate between open and closed positions;

a gate arm secured to the gate arm shaft, the gate arm configured to support the gate thereon and position the gate between the open and closed positions;

a motor having an output;

a linkage assembly comprising a first segment mechanically coupled to an output shaft and a second segment mechanically coupled to the gate arm such that in response to actuation of the motor, the linkage assembly transmits an opening force from the output shaft to the gate arm for positioning the gate toward the open position, and a closing force from the output shaft to the gate arm for positioning the gate toward the closed position; and a transfer assembly, the transfer assembly comprising an input link and a follower link, wherein a first end of the follower link is pivotably coupled to the gate arm shaft and a second end of the follower link is pivotably coupled to the input link such that stored energy released against the input link acts on the gate.

* * * * *